United States Patent
Wang

(10) Patent No.: US 10,845,626 B2
(45) Date of Patent: Nov. 24, 2020

(54) DISPLAY APPARATUS AND HEADPHONE CONTROL CIRCUIT THEREOF

(71) Applicant: Qingdao Hisense Electronics Co., Ltd., Shandong (CN)

(72) Inventor: Lin Wang, Shandong (CN)

(73) Assignee: QINGDAO HISENSE ELECTRONICS CO., LTD., Qingdao (CN)

( * ) Notice: Subject to any disclaimer, the term of this patent is extended or adjusted under 35 U.S.C. 154(b) by 0 days.

(21) Appl. No.: 16/540,346

(22) Filed: Aug. 14, 2019

(65) Prior Publication Data

US 2020/0026104 A1 Jan. 23, 2020

Related U.S. Application Data

(63) Continuation of application No. PCT/CN2019/093708, filed on Jun. 28, 2019.

(30) Foreign Application Priority Data

Jul. 17, 2018 (CN) .......................... 2018 1 0782471

(51) Int. Cl.
*G02F 1/01* (2006.01)
(52) U.S. Cl.
CPC ........ *G02F 1/0121* (2013.01); *H04R 2420/03* (2013.01); *H04R 2420/05* (2013.01)
(58) Field of Classification Search
CPC .. H04R 2420/05; H04R 2420/03; G02F 1/012
See application file for complete search history.

(56) References Cited

U.S. PATENT DOCUMENTS 9,183,162 B2 * 11/2015 Peng ...................... G06F 13/00

FOREIGN PATENT DOCUMENTS

| CN | 203872338 U | 10/2014 |
|---|---|---|
| CN | 104244160 A | 12/2014 |
| CN | 107864422 A | 3/2018 |

OTHER PUBLICATIONS

International Search Report dated Sep. 5, 2019 from corresponding application No. PCT/CN2019/093708.

\* cited by examiner

*Primary Examiner* — Regina N Holder
(74) *Attorney, Agent, or Firm* — Hauptman Ham, LLP

(57) ABSTRACT

Provided are a display apparatus and a headphone control circuit thereof including a main chip, a headphone port and a switch circuit including a control circuit, a left channel switch and a right channel switch, the control circuit, the left channel switch and the right channel switch connecting to the main chip, the control circuit connecting to the left channel switch and the right channel switch, the left channel switch and the right channel switch connecting to the headphone port; the control circuit configured to receive a control signal output from the main chip and, output according to the control signal a first signal to the left channel switch and a second signal to the right channel switch respectively, the first signal is used to control on or off of the left channel switch, and the second signal is used to control on or off of the right channel switch.

16 Claims, 8 Drawing Sheets

DISPLAY APPARATUS AND HEADPHONE CONTROL CIRCUIT THEREOF

CROSS-REFERENCE TO RELATED APPLICATIONS

The patent application is a continuation of International Application No. PCT/CN2019/093708, filed on Jun. 28, 2019, which claims the priority of the Chinese Patent Application No. 201810782471.0, filed on Jul. 17, 2018, the content of the two is hereby incorporated by reference herein in their entireties.

TECHNICAL FIELD

The present disclosure relates to the field of display apparatus technologies and, especially to a display apparatus and a headphone control circuit thereof.

BACKGROUND

With rapid development of the display apparatus technologies, in order to meet increasing demands for diversification from consumers, many display apparatuses such as televisions and computer monitors are equipped with headphone circuits to realize the function of playing audio signal. In addition to main speaker, the audio signal from the main chip of a display apparatus can be transmitted by a headphone after being amplified by the power amplifier in the headphone circuit. In order to enable the user to enjoy a TV show without affecting the rest of others around, the speaker of the display apparatus can be muted by inserting the headphone into the headphone jack on the display apparatus.

SUMMARY

This section provides a general summary of the disclosure, and is not a comprehensive disclosure of its full scope or all of its features.

Some embodiments in this disclosure provide a headphone control circuit of a display apparatus, including:
 a main chip;
 a headphone port; and
 a switch circuit, where the switch circuit includes a control circuit, a left channel switch and a right channel switch, where the control circuit, the left channel switch and the right channel switch are connected to the main chip, the control circuit is connected to the left channel switch and the right channel switch, and the left channel switch and the right channel switch are connected to the headphone port; and
 the control circuit is configured to receive a control signal output from the main chip and, output, according to the control signal, a first signal to the left channel switch and a second signal to the right channel switch respectively, where the first signal is used to control on or off of the left channel switch, and the second signal is used to control on or off of the right channel switch.

Some embodiments in this disclosure provide a display apparatus, including a headphone control circuit, where the headphone control circuit includes:
 a main chip;
 a headphone port; and
 a switch circuit, where the switch circuit includes a control circuit, a left channel switch and a right channel switch, where the control circuit, the left channel switch and the right channel switch are connected to the main chip, the control circuit is connected to the left channel switch and the right channel switch, and the left channel switch and the right channel switch are connected to the headphone port; and
 the control circuit is configured to receive a control signal output from the main chip and, output, according to the control signal, a first signal to the left channel switch and a second signal to the right channel switch respectively, where the first signal is used to control on or off of the left channel switch, and the second signal is used to control on or off of the right channel switch.

BRIEF DESCRIPTION OF DRAWING(S)

In order to describe technical solutions in the embodiments of the present disclosure or the related art more clearly, accompanying drawings used in description of the embodiments or the related art will be briefly described hereunder. Obviously, the described drawings are merely some embodiments of present disclosure. For persons skilled in the art, other drawings may be obtained based on these drawings without any creative effort.

Specific embodiments of the present disclosure have been shown through the above drawings, which will be described in more detail later. These drawings and the text description are not intended to limit the scope of the present disclosure in any way, but to illustrate concepts of the present disclosure to those skilled in the art upon reference to the specific embodiments.

DESCRIPTION OF EMBODIMENTS

The technical solutions in the embodiments of the present disclosure will be described hereunder clearly and comprehensively with reference to the accompanying drawings in the embodiments of the present disclosure. Obviously, the described embodiments are merely a part of embodiments of the present disclosure, rather than all embodiments of the present disclosure. All other embodiments obtained by persons of ordinary skill in the art based on the embodiments of the present disclosure without any creative effort should fall into the protection scope of the present disclosure.

Terms such as "first", "second", "third", "fourth", etc. (if present) in the specification and the claims as well as the described accompany drawings of the present disclosure are used to distinguish similar objects, but not intended to describe a specific order or sequence. It will be appreciated that the data used in this way is interchangeable under appropriate circumstances, such that the embodiments of the present disclosure described herein can be implemented in an order other than those illustrated or described herein, for instance. Moreover, terms such as "include" and "have" and any variation thereof are intended to cover a non-exclusive inclusion, e.g., processes, methods, systems, products or devices that encompass a series of steps or units are not necessarily limited to those steps or units that are clearly listed, but may include other steps or units that are not explicitly listed or inherent to these processes, methods, products or devices.

Figure 1A:
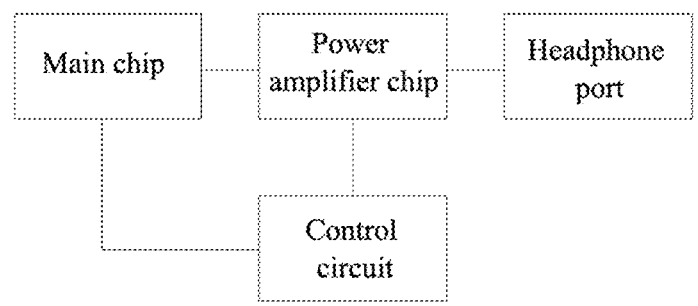
FIG. 1A is a schematic structural diagram of a headphone control circuit of a display apparatus in the related art.
Figure 1B:
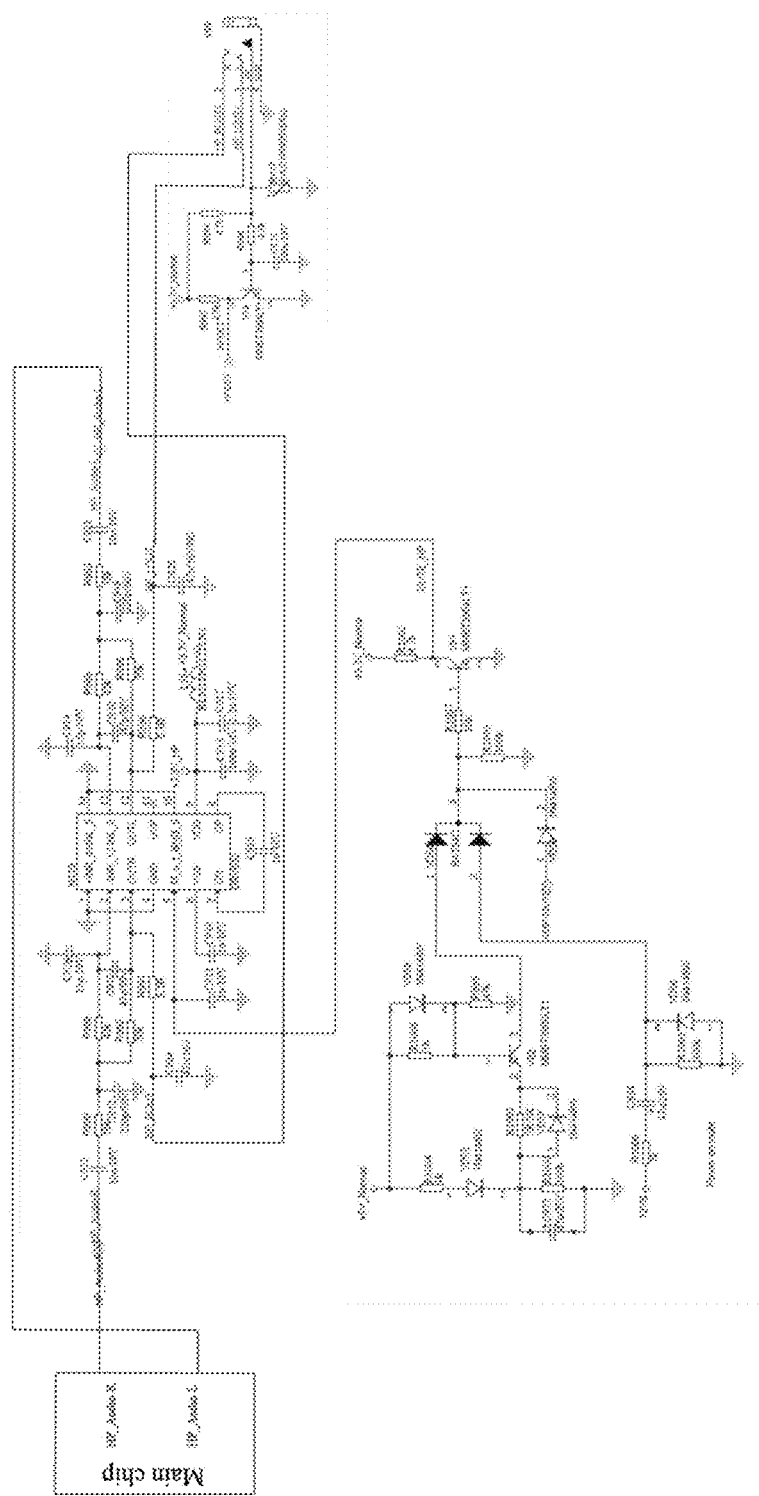
FIG. 1B is a schematic structural diagram of a headphone control circuit of a display apparatus in the related art.

FIG. 1A and FIG. 1B are schematic structural diagrams of a headphone control circuit of a display apparatus in the related art. In the related headphone control circuit of the display apparatus shown in FIG. 1A, since an audio signal output from the main chip has low power that cannot satisfied the minimum output power required for the headphone in the headphone port to play, the audio signal output from the main chip will pass through a power amplifier chip and then is output to the headphone port in order that the output audio signal from the headphone port will satisfy the minimum output power of the headphone.

In the related art, when the sound of the display apparatus is output from the headphone, if the user needs to perform a mute operation on the headphone output, the headphone of the display apparatus can be muted in two ways: one is capacitor discharge within the control circuit when the display apparatus is turned off, a change in the control circuit from a high level to a low level resulting from the capacitor discharge generates a control signal output to the power amplifier chip, the control signal is used to enable the power amplifier chip to disconnect the audio signal output from the main chip to the headphone port such that the headphone is muted; the other is, for instance, an operation on a remote controller, when the control circuit receives a mute control signal from the remote controller of the display apparatus, the control circuit outputs the control signal to the power amplifier chip to control the power amplifier chip to implement the mute of the headphone.

The headphone control circuit of the display apparatus as shown in FIG. 1B is a possible implementation of the headphone control circuit in FIG. 1A. The power amplifier chip is a chip denoted as N119 in the drawing, and the headphone port is a port denoted as XS9 in the drawing. The interface (denoted as HP_Audio-L) of the main chip is connected to the pin (denoted as 13) of the power amplifier chip N119 of the headphone, used for the main chip to output a left channel audio signal to the power amplifier chip; after being amplified by the power amplifier chip N119 of the headphone, the left channel audio signal passes through the pin denoted as 12 to output the audio signal HP_LOUT to the interface L denoted as 1 in the headphone port XS9 such that the amplified left channel audio signal is provided for the headphone. Similarly, the interface denoted as HP_Audio-R is connected to the pin (denoted as 2) of the power amplifier chip N119 of the headphone, used for the main chip to output a right channel audio signal to the power amplifier chip of the headphone; after being amplified by the power amplifier chip N119 of the headphone, the right channel audio signal passes through the pin denoted as 3 to output the audio signal HP_ROUT to the interface R denoted as 2 in the headphone port XS9 such that the amplified right channel audio signal is provided for the headphone.

The power amplifier chip N119 of the headphone also provides a pin denoted as 5 for enabling mute control of the headphone. After the power amplifier chip N119 of the headphone receives a mute control signal MUTE_HP through the pin denoted as 5, it stops outputting the right channel audio signal through the pin denoted as 3 and stops outputting the left channel audio signal through the pin denoted as 12, thereby achieving turnoff of an output sound from the headphone of the display apparatus.

Figure 2:
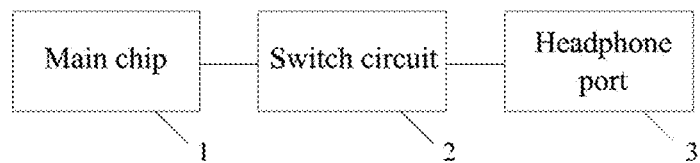
FIG. 2 is a schematic structural diagram of an embodiment of a headphone control circuit of a display apparatus according to the present disclosure.

For the circuit shown in FIG. 2, the mute control signal MUTE HP for controlling the power amplifier chip has two generation modes.

The first is that when the display apparatus is turned off, the input voltage denoted as +5V_Normal in the drawing is reduced to 0V, and meanwhile the negative electrode of the capacitor denoted as C933 is grounded. At this point, the capacitor C933 needs to be discharged through the resistor denoted as R1000. After the capacitor C933 is discharged, the emitter of the triode V82 connected to the positive electrode of the capacitor is at a high level. However, since +5V_Normal will be 0V, the base of the triode V82 is also reduced to a level of 0V, and the triode V82 becomes conducting. After the triode V82 becomes conducting, the collector of the triode V82 outputs a high level, and the diode VD54 becomes conducting; similarly, 12VS rapidly drops to 0V when the power is turned off, the capacitor C9343 is discharged, and the diode BAT54C is turned on; in addition, when the power is turned off, the mute control signal MUTE_HP cannot be received, thus the diode VD50 is cut off. In summary, the triode V81 has a high level at the base, the triode V81 becomes conducting, and its collector is pulled down, that is to say, after the high level output from the collector of the triode V82 is inverted by the triode V81, the low level signal which is finally obtained is the mute control signal MUTE_HP. The mute control signal MUTE_HP is input into the power amplifier chip N119 of the headphone through the pin denoted as 5 in the chip N119. After the power amplifier chip N119 of the headphone receives the low level mute control signal at the pin denoted as 5, it stops outputting the audio signal to the headphone port XS9 such that the headphone is muted. The capacitors C933 and C934 function to use capacitor discharge to maintain the pin denoted as 5 of the headphone power amplifier chip at a low voltage when the display apparatus is turned off, so that the headphone power amplifier chip outputs no audio signal at the pins denoted as 3 and 12, thereby preventing the main chip from outputting some uncontrollable audio signals after the display apparatus is turned off, which in turn will affect user experience.

The second is that the diode denoted as VD50 receives a software mute indication signal AMP_MUTE through the interface denoted as 1, such as the software mute indication signal transmitted by the remote controller of the display apparatus; the mute indication signal AMP_MUTE is a high level signal, at this point, the diode VD50 becomes conducting; in addition, since the system operates normally, the branches where the capacitors C933 and C934 reside are disconnected, and the diode VD54 and the diode BAT54C are cut off. Therefore, the triode V81 has a high level at the base, and the triode V81 becomes conducting, that is, after the software mute indication signal AMP_MUTE is also inverted by the triode V81, the mute control signal MUTE_HP is obtained and input into the power amplifier chip N119 of the headphone at the pin denoted as 5 so that the power amplifier chip N119 of the headphone implements the mute of the headphone.

In summary, due to incorporation of capacitors, the structure of the headphone control circuit in the above related art is to ensure the mute of the display apparatus upon the turnoff thereof, but the capacitors belong to analog components, and as the apparatus ages and is damaged, a phenomenon that the display apparatus also outputs uncontrollable noise and pops upon its turnoff will also occur, which affects user experience.

In addition, since the control signal transmitted by the control circuit to the power amplifier chip needs to be subjected to an inverse operation, and the power amplifier chip also needs to perform an operation in which it stops outputting the audio signal to the headphone port according to the control signal. These steps all have a certain delay for the headphone mute control. Therefore, the case that either the control signal is generated due to the capacitor discharge at the turnoff of the display apparatus or is generated due to the control from the user's remote controller will cause a low response speed at which the headphone of the display apparatus is muted; also, the user experience of the display apparatus is further reduced.

The present disclosure provides a headphone control circuit of a display apparatus, the mute operation of the headphone at the turnoff of the display apparatus is improved by simplifying the headphone control circuit of the display apparatus, so that the display apparatus will not output uncontrollable noise, thereby improving user experience of the display apparatus.

The technical solutions of the present disclosure will be described hereunder in detail with specific embodiments. The specific embodiments hereinafter may be combined with each other, and for the same or similar concepts or processes, details may be omitted in some embodiments.

FIG. 2 is a schematic structural diagram of an embodiment of a headphone control circuit of a display apparatus according to the present disclosure. As shown in FIG. 2, the headphone control circuit of the display apparatus provided in the present embodiment includes: a main chip 1, a switch circuit 2 and a headphone port 3. The main chip 1 is connected to the headphone port 3 through the switch circuit 2. An audio signal output from the main chip 1 can be output to the headphone port 3 through the switch circuit 2, and the audio signal output from the main chip 1 has power greater than or equal to preset power of a headphone in the headphone port 3, the main chip 1 is configured to output a control signal to the switch circuit 2, and the control signal is used to switch the switch circuit 2 to an off state or an on state.

In the headphone control circuit of the display apparatus according to the present embodiment, the audio signal output from the main chip 1 has been amplified to first power, where the first power is greater than or equal to preset power of the headphone, the preset power may be the minimum output power of the headphone, and the minimum output power of the headphone is power of an audio signal that can be output normally when the headphone is tuned to the lowest sound. For instance, if a certain headphone has minimum output power of 5 milliwatts (mw), then the first power for the audio signal that can be output from the main chip 1 at this time needs to be greater than or equal to 5 mw. If different headphones have different minimum output power, the main chip 1 may determine the minimum output power of the headphones by way of the headphones detecting or reporting their modes, which is not specifically limited in the present embodiment. Optionally, in order to improve sound quality of the audio signal output from the main chip, the audio signal output from the main chip may further pass through a Resistance-Capacitance (RC) filter, also known as a phase shift filter, and be input to the headphone port after a filtered interference cancellation. The foregoing preset power may also be greater than the minimum output power, and the implementation thereof is similar, for which details will be omitted.

In some embodiments, such as the headphone control circuit of the display apparatus shown in FIG. 2, when the switch circuit 2 is in an on state, the path from the main chip 1 to the headphone port 3 becomes conducting, and the audio signal output from the main chip 1 can be output to the headphone port 3 through the switch circuit 2 to provide an audio signal for the headphone in the headphone port 3; when the switch circuit 2 is in an off state, the path from the main chip 1 to the headphone port 3 is disconnected, and the audio signal output from the main chip 1 cannot be output to the headphone port 3 through the switch circuit 2, thereby implementing the mute of the headphone. The off state and the on state of the switch circuit 2 can be switched in accordance to a control signal transmitted by the main chip 1. For instance, when the main chip 1 transmits a high level control signal to the switch circuit 2, the switch circuit 2 is switched on; when the main chip 1 transmits a low level control signal to the switch circuit 2, the switch circuit 2 is switched off. The form in which the control signal is at a high/low level is merely an example, and a specific form of the control signal is not limited in the present embodiment.

In some embodiments, the control signal for switching the state of the switch circuit 2 in the present embodiment can also be generated by power off and receiving a mute indication. Illustrations are made by taking the high/low level in the above example as an example, the pin used for the main chip 1 to output signal to the switch circuit 2 provides that the control signal output by default is a low level control signal, that is, the control signal output from the main chip 1 to the switch circuit 2 is a low level control signal when no headphone is inserted into the headphone port 3 or the power is not on, so that a default state of the switch circuit 2 is the off state. When it is detected that the headphone is inserted into the headphone port 3 (for the detection method, reference may be made to the embodiment of FIG. 7 or FIG. 8), the main chip 1 outputs a high level control signal to the switch circuit 2 to switch the switch circuit 2 to the on state, so that the audio signal output from the main chip 1 can be output to the headphone port 3 through the switch circuit 2. Therefore, when the display apparatus is turned off, the main chip is powered down, and the pin used for the main chip to output the control signal to the switch circuit 2 restores the low level control signal output by default, so that the state of the switch circuit 2 is switched to or proceed to maintain in the off state. Therefore, the mute of the headphone is implemented for the display apparatus.

In addition, during implementation of the mute of the headphone for the display apparatus in a mute indication manner, a mute indication transmitted by, for instance, the remote controller of the display apparatus can be received, and the mute indication may be directly output to the switch circuit 2 by means of a control signal, so that the switch circuit 2 is switched to the off state, implementing the mute of the headphone for the display apparatus. Alternatively, after the main chip receives the mute indication, the control signal may be transmitted by the main chip to the switch circuit 2, so that the switch circuit 2 is switched to the off state, implementing the mute of the headphone for the display apparatus.

Therefore, in summary, in the headphone control circuit of the display apparatus according to the present embodiment, since the main chip directly outputs an audio signal satisfying the minimum output power of the headphone, the power amplifier chip may not be provided in the headphone control circuit of the display apparatus, and the audio signal of the main chip may be directly input into the headphone port through the switch circuit. Hence, when the headphone control circuit of the display apparatus is controlling the headphone of the display apparatus to be muted, it is not necessary to implement the mute of the headphone through the manner in the related art that the main chip indirectly controls the headphone power amplifier chip, instead the main chip may implement the mute of the headphone directly through on and off of the switch circuit, thereby reducing circuit complexity of the headphone control circuit for the display apparatus. Moreover, when the mute of the headphone is implemented through the main chip directly controlling the on and off of the switch circuit, a capacitor for controlling the mute of the power amplifier chip when the display apparatus is turned on and turned off will not be provided in the headphone control circuit of the display apparatus, nor will occur a phenomenon that the display apparatus still outputs uncontrollable noise and pops upon its turnoff due to failed control of the mute of the power amplifier chip resulting from aging and damage of the capacitor, thereby improving the sound quality of the headphone for the display apparatus when the headphone is muted, and improving user experience of the display apparatus.

In addition, according to the headphone control circuit of the display apparatus provided in the present embodiment, since the main chip may implement the mute of the headphone directly through on and off of the switch circuit, for the case that either the headphone is muted when the display apparatus is turned off or the headphone is muted due to the control from the user's remote controller, the mute of the headphone will be implemented by controlling the main chip to transmit a control signal directly to the switch circuit. Compared with the related art where the main chip indirectly controls the power amplifier chip to implement the mute of the headphone, this is more direct, which reduces complexity and time complexity of the headphone control circuit of the display apparatus, reduces the response time for the headphone of the display apparatus to mute, and further improves user experience of the display apparatus.

Figure 3:
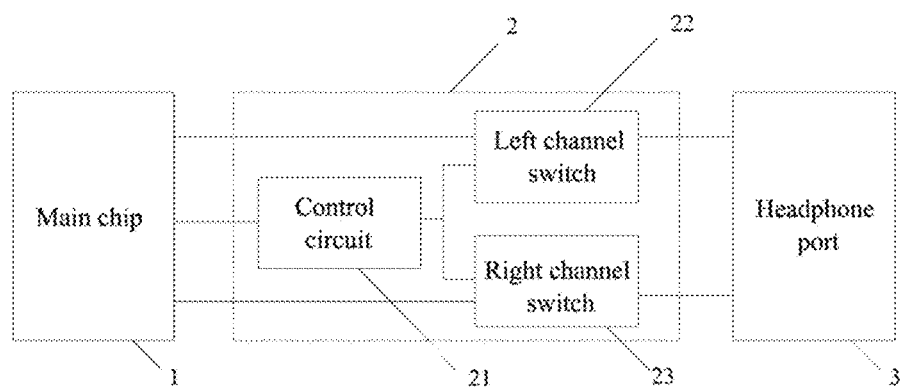
FIG. 3 is a schematic structural diagram of an embodiment of a headphone control circuit of a display apparatus according to the present disclosure.

FIG. 3 is a schematic structural diagram of an embodiment of a headphone control circuit of a display apparatus according to the present disclosure. The headphone control circuit shown in FIG. 3 is based on the embodiment shown in FIG. 2. The switch circuit 2 includes a control circuit 21, a left channel switch 22, and a right channel switch 23. A left channel audio signal output from the main chip 1 can be output to the headphone port 3 through the left channel switch 22, and a right channel audio signal output from the main chip 1 can be output to the headphone port 3 through the right channel switch 23. The control circuit 21 is configured to receive a control signal output from the main chip 1 and, output, according to the control signal, a first signal to the left channel switch 22 and a second signal to the right channel switch 23, where the first signal is used to control on and off of the left channel switch 22, and the second signal is used to control on and off of the right channel switch 23.

In some embodiments, in the embodiment shown in FIG. 3 which is based on the embodiment shown in FIG. 2, the audio signal output from the main chip 1 is further divided into a left channel audio signal and a right channel audio signal, the two signals are transmitted to the headphone port 3 after passing through different switches within the switch circuit 2, and the headphone in the headphone port 3 can finally output two kinds of audio signals according to the received left channel audio signal and the right channel audio signal. The control circuit 21 can control on and off of the left channel switch 22 and the right channel switch 23. Generally, the control circuit 21 needs to control the left channel switch 22 and the right channel switch 23 according to the received control signal, open or closed simultaneously. Where appropriate, the control circuit 21 can also separately control the left channel switch 22 and the right channel switch 23 to be in different states, an open or on state, which is not limited in the present embodiment.

When the control circuit 21 controls the left channel switch 22 to be closed, the left channel audio signal output from the main chip 1 can be transmitted to the headphone port 3 through the left channel switch 22 that is closed; when the control circuit 21 controls the left channel switch 22 to be open, the left channel audio signal output from the main chip 1 cannot be transmitted to the headphone port 3 through the left channel switch 22 that is open, implementing the mute of the left channel of the headphone. Similarly, when the control circuit 21 controls the right channel switch 23 to be closed, the right channel audio signal output from the main chip 1 can be transmitted to the headphone port 3 through the right channel switch 23 that is closed; when the control circuit 21 controls the right channel switch 23 to be open, the right channel audio signal output from the main chip 1 cannot be transmitted to the headphone port 3 through the right channel switch 23 that is open, implementing the mute of the right channel of the headphone.

Figure 4:
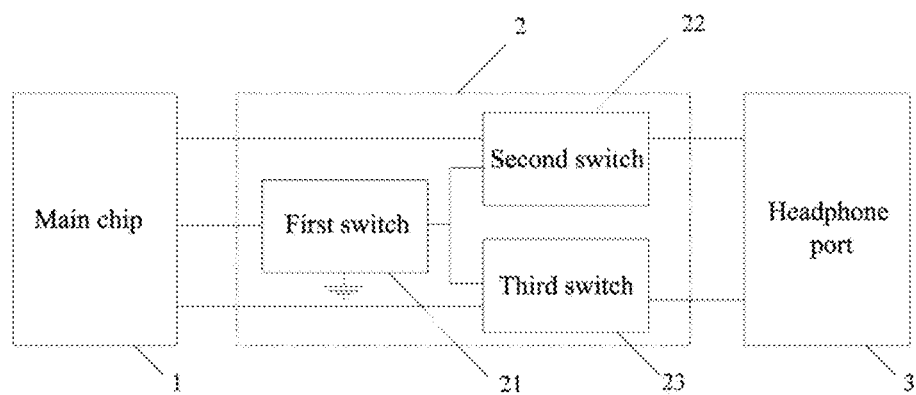
FIG. 4 is a schematic structural diagram of an embodiment of a headphone control circuit of a display apparatus according to the present disclosure.

FIG. 4 is a schematic structural diagram of an embodiment of a headphone control circuit of a display apparatus according to the present disclosure. The headphone control circuit shown in FIG. 4 provides a more specific implementation on the basis of the embodiment shown in FIG. 3, where the control circuit 21 is a first switch, the left channel switch 22 is a second switch, and the right channel switch 23 is a third switch.

In some embodiments, the first switch has its first terminal connected to the main chip for receiving a control signal output from the main chip; the first switch has its second terminal connected to the left channel switch for outputting the first signal to the left channel switch; the first switch has its second terminal further connected to the right channel switch for outputting the second signal to the right channel switch, and the first switch has its third terminal grounded. The second switch has its first terminal connected to the main chip for receiving the left channel audio signal output from the main chip; the second switch has its second terminal connected to the headphone port for outputting the left channel audio signal to the headphone port; and the second switch has its third terminal connected to the second terminal of the first switch for receiving the first signal. The third switch has its first terminal connected to the main chip for receiving the right channel audio signal output from the main chip; the third switch has its second terminal connected to the headphone port for outputting the right channel audio signal to the headphone port; and the third switch has its third terminal connected to the second terminal of the first switch for receiving the second signal.

In some embodiments, when the first switch receives the control signal transmitted by the main chip, on and off of the second switch and on and off of the third switch can be controlled according to the control signal. When the first switch controls the second switch to be closed through the first signal, the left channel audio signal output from the main chip can be transmitted to the headphone port through the second switch that is closed; when the first switch controls the second switch to be open through the first signal, the left channel audio signal output from the main chip cannot be transmitted to the headphone port through the second switch that is open, implementing the mute of the left channel of the headphone. Similarly, when the first switch controls the third switch to be closed through the second signal, the right channel audio signal output from the main chip can be transmitted to the headphone port through the third switch that is closed; when the first switch controls the third switch to be open through the second signal, the right channel audio signal output from the main chip cannot be transmitted to the headphone port through the third switch that is open, implementing the mute of the right channel of the headphone.

In the example shown in FIG. 4, the first signal output from the first switch to the second switch and the second signal output to the third switch are the same signal output from the first switch, for implementing on or off of the second switch and the third switch at the same time. That is, in order to simultaneously control the states of the second switch and the third switch, two different signals are output to the second switch and the third switch, respectively, only due to the connection mode of the circuit. However, in order to separately control the second switch and the third switch to be open or closed, one output of the first switch may be connected to the second switch, and the other output is connected to the third switch; moreover, the first signal is output to the second switch, and the second signal inverse to the first signal is output to the third switch, thereby implementing separate control of the second switch and the third switch, for a specific implementation thereof, details will be omitted.

Figure 5:
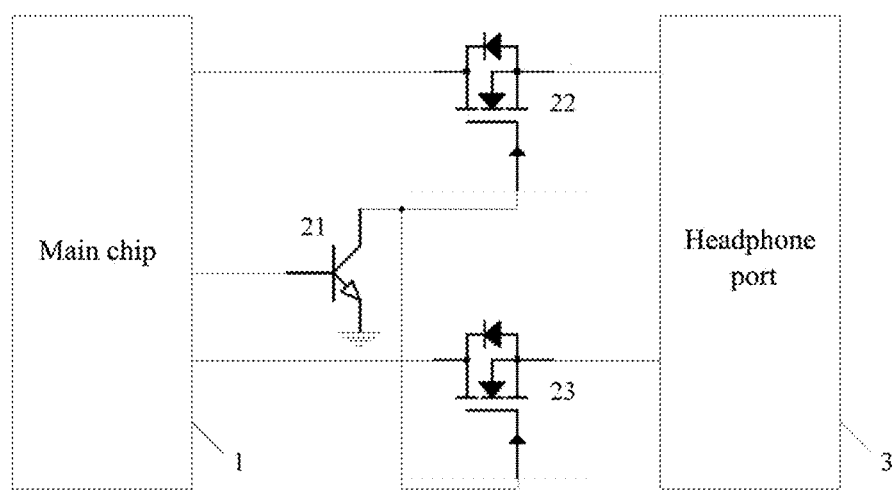
FIG. 5 is a schematic structural diagram of an embodiment of a headphone control circuit of a display apparatus according to the present disclosure.

In some embodiments, FIG. 5 is a schematic structural diagram of an embodiment of a headphone control circuit of a display apparatus according to the present disclosure. According to the headphone control circuit shown in FIG. 5 which is based on the embodiment shown in FIG. 4, the forgoing switches are implemented by a triode and a metal oxide semiconductor (MOS) transistor. Each one of the first switch, the second switch and the third switch may be a triode or an MOS transistor, and the three switches may be arbitrarily combined. In one implementation, as shown in FIG. 5, the first switch serving to receive the control signal may be a triode, since the MOS transistor has a stronger driving capability relative to the triode, the second switch and the third switch for transmitting the audio signals may be MOS transistors.

Figure 6:
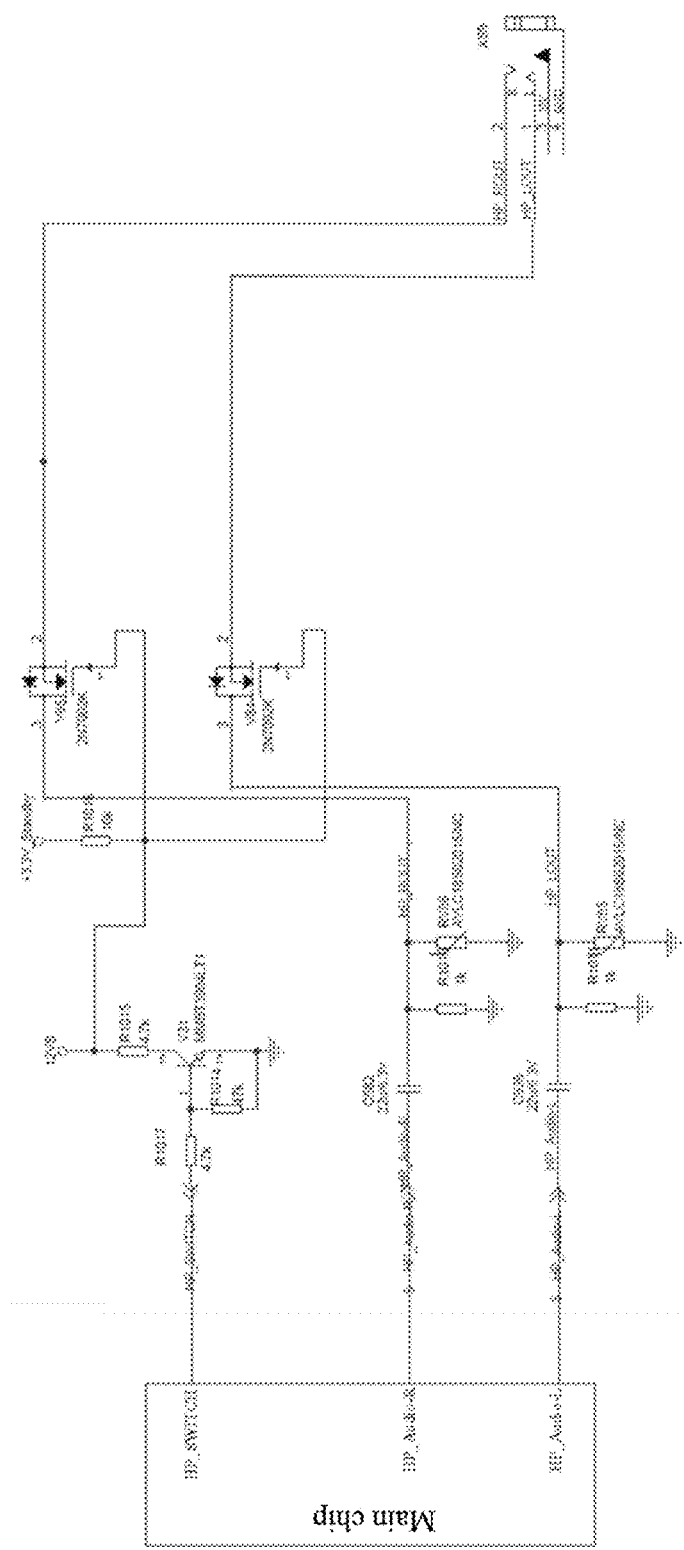
FIG. 6 is a schematic structural diagram of an embodiment of a headphone control circuit of a display apparatus according to the present disclosure.

FIG. 6 is a schematic structural diagram of an embodiment of a headphone control circuit of a display apparatus according to the present disclosure. FIG. 6 shows a circuit connection mode of the control circuit 2 in the embodiment of FIG. 5 described previously. The triode denoted as V31 may be the first switch described in the above embodiment, the MOS transistor denoted as V84 may be the second switch described in the above embodiment, the MOS transistor denoted as V85 may be the third switch described in the above embodiment, and the port denoted as XS9 may be the headphone port described in the above embodiment.

In some embodiments, the main chip is connected to the second switch V84 in the control circuit at the pin denoted as HP_Audio-L for the main chip to output the left channel audio signal HP_LOUT to the pin denoted as L of the headphone port XS9 through the second switch V84; the main chip is connected to the third switch V85 in the control circuit at the pin denoted as HP_Audio-R for the main chip to output the right channel audio signal HP_ROUT to the pin denoted as R of the headphone port XS9 through the third switch V85. The main chip is connected to the first switch V31 through the pin denoted as HP_SWITCH, and the main chip outputs a control signal to the first switch V31 through this pin, so that the first switch V31 controls states of the second switch V84 and the third switch V85 according to the control signal.

In some embodiments, the pin HP_SWITCH of the main chip is a general purpose input/output GPIO port of the main chip, that is, the main chip outputs a control signal to the control circuit through its GPIO port. The purpose of providing the first switch V31 in the circuit shown in FIG. 6 is to increase the driving capability of the control signal and maintain a high-impedance state for the GPIO port of the main chip.

In some embodiments, in the example depicted in FIG. 6, the control signal may be a high level signal output from the main chip through the pin HP_SWITCH. The first switch V31 has a high level at the base, the first switch V31 becomes conducting, and the collector and the emitter of the first switch V31 become conducting. The first switch V31 has its emitter grounded, and the collector is at a low level, the collector of the first switch V31 outputs a low level to the gate of the second switch V84 and the gate of the third switch V85, so that the second switch V84 and the third switch V85 are cut off, the drain and the source of the second switch V84 are disconnected, and the drain and the source of the third switch V85 are disconnected, which in turn makes that the left channel audio signal HP_LOUT in the interface HP_Audio-L connected to the drain of the second switch V84 cannot be output to the pin denoted as L in the headphone port through the second switch V84, implementing the mute of the left channel of the headphone, and which makes that the right channel audio signal HP_ROUT in the interface HP_Audio-R connected to the drain of the third switch cannot be output to the pin denoted as R in the headphone port through the third switch V85, implementing the mute of the right channel of the headphone.

In the specific circuit connection of FIG. 6 described above, the control signal being a high level signal is merely an example. The control signal may also be a low level signal, and it only needs to adjust the circuit connection relationship shown in FIG. 6, for instance, by adding a triode to re-invert the control signal, the same control mode as in FIG. 6 can be achieved, and a specific implementation of the control signal is not limited in the present embodiment.

In summary, according to the headphone control circuit of the display apparatus provided in the present embodiment, a control signal is transmitted to the control circuit through the GPIO port of the main chip, and the control circuit can directly control the off state or the on state of the left channel switch and the right channel switch according to the control signal. When the left channel switch and the right channel switch of the control circuit are simultaneously open, the mute of the headphone can be implemented for the display apparatus. Therefore, a function of mute control on the headphone of the display apparatus is achieved in a relatively simple circuit connection manner, the headphone power amplifier circuit is simplified, the cost of the main board of the display apparatus is reduced, and the circuit can directly control the control circuit through the main chip to implement the mute of the headphone. There is no need to provide, in the control circuit, a capacitor for controlling the mute of the power amplifier chip when the display apparatus is turned on and turned off will not be provided, nor will occur a phenomenon that the display apparatus still outputs uncontrollable noise and pops upon its turnoff due to failed control of the mute of the power amplifier chip resulting from aging and damage of the capacitor, thereby improving the sound quality of the headphone for the display apparatus when the headphone is muted, and improving user experience of the display apparatus.

Figure 7:
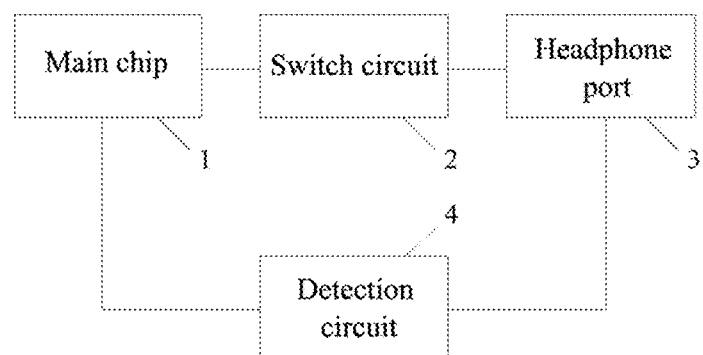
FIG. 7 is a schematic structural diagram of an embodiment of a headphone control circuit of a display apparatus according to the present disclosure.

FIG. 7 is a schematic structural diagram of an embodiment of a headphone control circuit of a display apparatus according to the present disclosure. Based on the above embodiment, the headphone control circuit shown in FIG. 7 further includes: a detection circuit 4 having its first terminal connected to the main chip 1 and its second terminal connected to the headphone port 3, where the main chip 1 detects via the detection circuit 4 whether a headphone is inserted into the headphone port 3, and when the headphone is inserted into the headphone port 3, the main chip 1 controls a speaker of the display apparatus to be muted.

Figure 8:
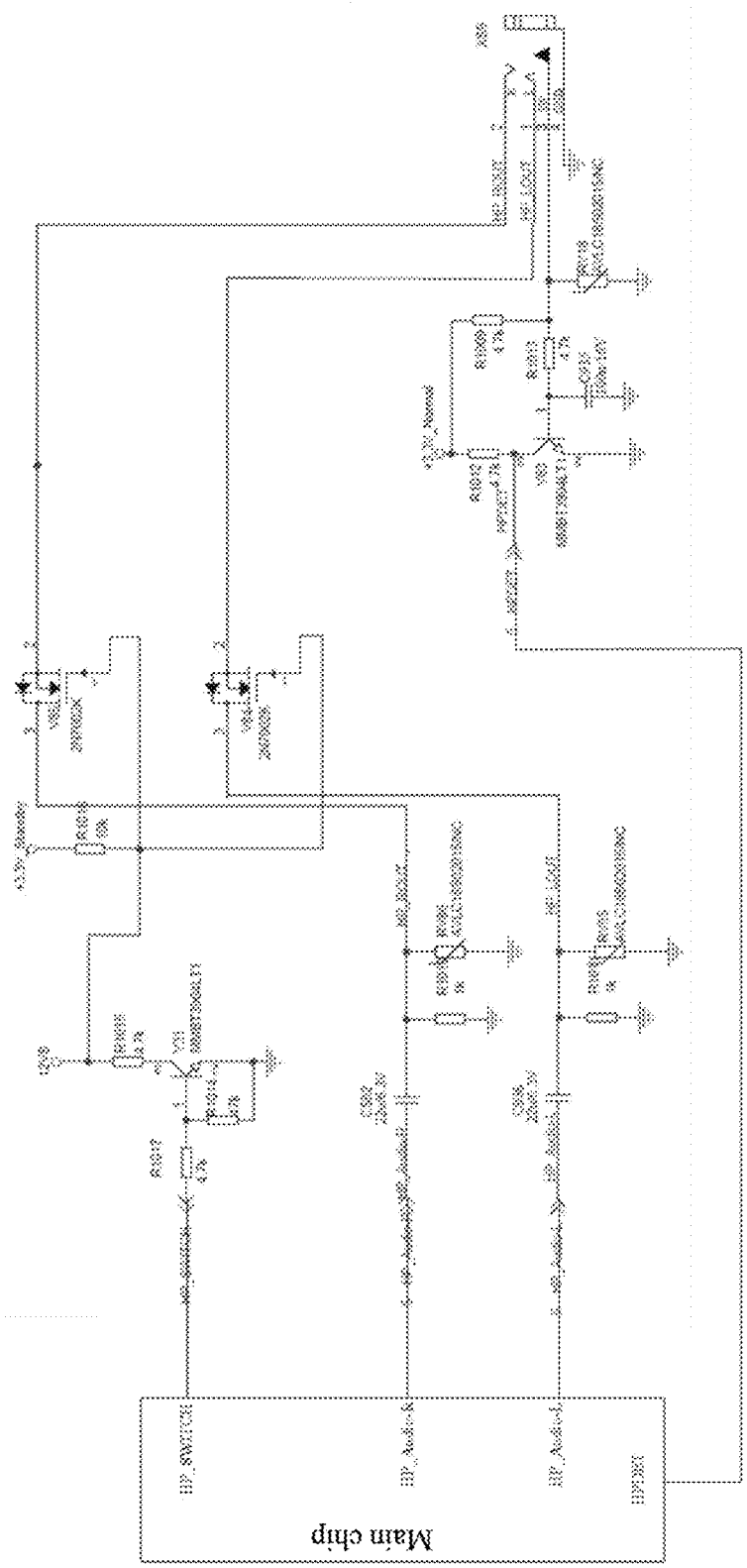
FIG. 8 is a schematic structural diagram of an embodiment of a headphone control circuit of a display apparatus according to the present disclosure.

FIG. 8 is a schematic structural diagram of an embodiment of a headphone control circuit of a display apparatus according to the present disclosure. Taking the specific circuit connection mode in FIG. 8 as an example, the detection circuit has its first terminal connected to the pin HPDET of the main chip, its second terminal connected to the pin SW of the headphone port XS9, and its third terminal connected to the pin GND of the headphone port XS9. The pin HPDET of the main chip is configured to detect via the detection circuit whether a headphone is inserted into the headphone port. When the headphone is inserted into the headphone port XS9, the pins denoted as SW and GND in the headphone port XS9 become conducting. The pin GND is a ground pin, and the pin SW is used for connection with the pin HPDET of the main chip through the detection circuit. When the headphone is inserted into the headphone port, a path from the pin SW to the pin GND of the headphone is formed. In this path, there will be a level change in the pin HPDET of the main chip since the GND interface is grounded. When the main chip determines via the level change of the pin HPDET that a headphone is inserted into the headphone port XS9, the main chip outputs a control signal to the first switch V31 through the pin HP_SWITCH to finally control the headphone of the display apparatus to be muted.

Figure 9:
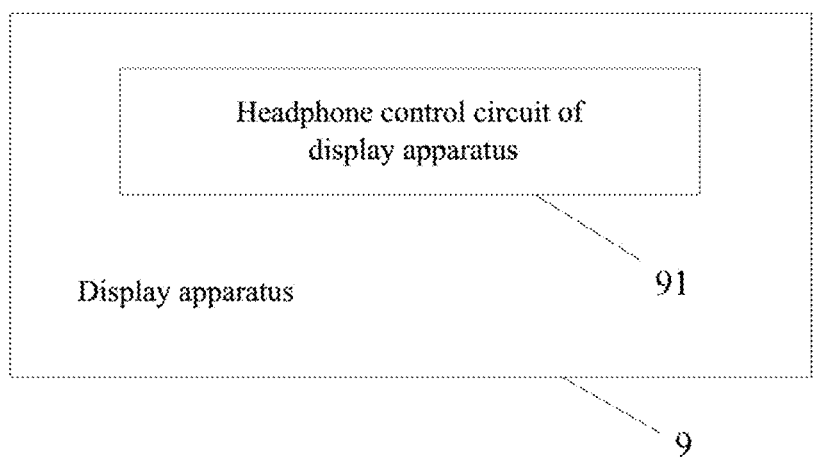
FIG. 9 is a schematic structural diagram of an embodiment of a display apparatus according to the present disclosure.

FIG. 9 is a schematic structural diagram of an embodiment of a display apparatus according to the present disclosure. As shown in FIG. 9, the display apparatus 9 provided in the present embodiment includes the headphone control circuit 91 of the display apparatus according to any of embodiments depicted in FIG. 1-FIG. 8. The display apparatus 9 may be an apparatus for displaying, such as a television, a computer monitor, or a video player.

The above descriptions are merely preferred embodiments of the present disclosure, and shall not be considered as a limitation to the present disclosure in any way. Any simple amendment, equivalent variation and modification made to the above embodiments according to the technical essence of the present disclosure shall fall into the scope of the technical solutions of the present disclosure.

Finally, it should be noted that the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make amendments to the technical solutions described in the foregoing embodiments, or make equivalent replacements to some or all technical features therein; however, these amendments or replacements do not make the essence of corresponding technical solutions depart from the scope of the technical solutions in the embodiments of the present disclosure.

What is claimed is:

1. A headphone control circuit of a display apparatus, comprising:
   a main chip;
   a headphone port;
   a switch circuit, which comprises a control circuit, a left channel switch and a right channel switch, wherein the control circuit, the left channel switch and the right channel switch are connected to the main chip, the control circuit is connected to the left channel switch and the right channel switch, and the left channel switch and the right channel switch are connected to the headphone port; where the control circuit is configured to receive a control signal output from the main chip and, output, according to the control signal, a first signal to the left channel switch and a second signal to the right channel switch respectively, wherein the first signal is configured to control on or off of the left channel switch, and the second signal is configured to control on or off of the right channel switch;
   wherein the headphone control circuit does not comprise a power amplifier, and
   a left channel audio signal output from the main chip is output to the headphone port through the left channel switch directly rather than being output to the power amplifier and then to the left channel switch, a right channel audio signal output from the main chip is output to the headphone port through the right channel switch directly rather than being output to the power amplifier and then to the right channel switch, the left channel audio signal and the right channel audio signal have power greater than or equal to a preset power, wherein the preset power is a minimum output power of a headphone in the headphone port.

2. The circuit according to claim 1, wherein the control circuit comprises a first switch; wherein a first terminal of the first switch being connected to the main chip for receiving a control signal output from the main chip, a second terminal of the first switch being connected to both the left channel switch for outputting the first signal to the left channel switch and the right channel switch for outputting the second signal to the right channel switch; and a third terminal of the first switch being grounded.

3. The circuit according to claim 2, wherein the left channel switch comprises a second switch; wherein a first terminal of the second switch being connected to the main chip for receiving the left channel audio signal output from the main chip; a second terminal of the second switch being connected to the headphone port for outputting the left channel audio signal to the headphone port; and a third terminal of the second switch being connected to the second terminal of the first switch for receiving the first signal.

4. The circuit according to claim 3, wherein the right channel switch comprises a third switch; wherein a first terminal of the third switch being connected to the main chip for receiving the right channel audio signal output from the main chip; a second terminal of the third switch being connected to the headphone port for outputting the right channel audio signal to the headphone port; and a third terminal of the third switch being connected to the second terminal of the first switch for receiving the second signal.

5. The circuit according to claim 4, wherein the first switch is a triode, and the second switch and the third switch are metal oxide semiconductor (MOS) transistors.

6. The circuit according to claim 5, wherein the first terminal of the first switch is a base, the second terminal of the first switch is a collector, and the third terminal of the first switch is an emitter; the first terminal of the second switch is a drain, the second terminal of the second switch is a gate, and the third terminal of the second switch is a source; and the first terminal of the third switch is a drain, the second terminal of the third switch is a gate, and the third terminal of the third switch is a source.

7. The circuit according to claim 6,
wherein when the control signal is a high level signal, the collector and the emitter of the first switch become conducting after the first switch receives the high level signal at the base; the first switch has a low level at the collector and outputs a low level signal to the gate of the second switch and the gate of the third switch such that the drain and the source of the second switch are disconnected and the drain and the source of the third switch are disconnected;
when the control signal is a low level signal, the collector and the emitter of the first switch are disconnected after the first switch receives the low level signal at the base; the first switch has a high level at the collector and outputs a high level signal to the gate of the second switch and the gate of the third switch such that the drain and the source of the second switch become conducting and the drain and the source of the third switch become conducting.

8. The circuit according to claim 1, wherein the main chip outputs the control signal to the control circuit specifically through a general-purpose input/output (GPIO) port.

9. The circuit according to claim 1, further comprising:
a detection circuit; a first terminal of the detection circuit being connected to the main chip and a second terminal of the detection circuit connected to the headphone port, wherein the main chip detects via the detection circuit whether a headphone is inserted into the headphone port, and when the headphone is inserted into the headphone port, the main chip controls a speaker of the display apparatus to be muted.

10. A display apparatus, comprising: a headphone control circuit, wherein the headphone control circuit comprises:
a main chip;
a headphone port;
a switch circuit, which comprises a control circuit, a left channel switch and a right channel switch, wherein the control circuit, the left channel switch and the right channel switch are connected to the main chip, the control circuit is connected to the left channel switch and the right channel switch, and the left channel switch and the right channel switch are connected to the headphone port; where the control circuit is configured to receive a control signal output from the main chip and, output, according to the control signal, a first signal to the left channel switch and a second signal to the right channel switch respectively, wherein the first signal is configured to control on or off of the left channel switch, and the second signal is configured to control on or off of the right channel switch;
wherein the headphone control circuit does not comprise a power amplifier, and
wherein a left channel audio signal output from the main chip is output to the headphone port through the left channel switch directly rather than being output to the power amplifier and then to the left channel switch, a right channel audio signal output from the main chip is output to the headphone port through the right channel switch directly rather than being output to the power amplifier and then to the right channel switch, the left channel audio signal and the right channel audio signal have power greater than or equal to a preset power, wherein the preset power is a minimum output power of a headphone in the headphone port.

11. The display apparatus according to claim 10, wherein the control circuit comprises a first switch; wherein a first terminal of the first switch being connected to the main chip for receiving a control signal output from the main chip, a second terminal of the first switch being connected to both the left channel switch for outputting the first signal to the left channel switch and the right channel switch for outputting the second signal to the right channel switch; and a third terminal of the first switch being grounded.

12. The display apparatus according to claim 11, wherein the left channel switch comprises a second switch; wherein a first terminal of the second switch being connected to the main chip for receiving the left channel audio signal output from the main chip; a second terminal of the second switch being connected to the headphone port for outputting the left channel audio signal to the headphone port; and a third terminal of the second switch being connected to the second terminal of the first switch for receiving the first signal.

13. The display apparatus according to claim 12, wherein the right channel switch comprises a third switch; wherein a first terminal of the third switch being connected to the main chip for receiving the right channel audio signal output from the main chip; a second terminal of the third switch being connected to the headphone port for outputting the right channel audio signal to the headphone port; and a third terminal of the third switch being connected to the second terminal of the first switch for receiving the second signal.

14. The display apparatus according to claim 13, wherein the first switch is a triode, and the second switch and the third switch are metal oxide semiconductor (MOS) transistors; and wherein the first terminal of the first switch is a base, the second terminal of the first switch is a collector, and the third terminal of the first switch is an emitter; the first terminal of the second switch is a drain, the second terminal of the second switch is a gate, and the third terminal of the second switch is a source; and the first terminal of the third switch is a drain, the second terminal of the third switch is a gate, and the third terminal of the third switch is a source.

15. The display apparatus according to claim 14, wherein when the control signal is a high level signal, the collector and the emitter of the first switch become conducting after the first switch receives the high level signal at the base; the first switch has a low level at the collector and outputs a low level signal to the gate of the second switch and the gate of the third switch such that the drain and the source of the second switch are disconnected and the drain and the source of the third switch are disconnected;
when the control signal is a low level signal, the collector and the emitter of the first switch are disconnected after the first switch receives the low level signal at the base; the first switch has a high level at the collector and outputs a high level signal to the gate of the second switch and the gate of the third switch such that the drain and the source of the second switch become conducting and the drain and the source of the third switch become conducting.

16. The display apparatus according to claim 10, wherein further comprising:
a detection circuit; a first terminal of the detection circuit being connected to the main chip and a second terminal of the detection circuit connected to the headphone port, wherein the main chip detects via the detection circuit whether a headphone is inserted into the headphone port, and when the headphone is inserted into the headphone port, the main chip controls a speaker of the display apparatus to be muted.

* * * * *